US010180523B2

(12) United States Patent
Koch

(10) Patent No.: US 10,180,523 B2
(45) Date of Patent: Jan. 15, 2019

(54) GRATING AND LENS SYSTEM FOR COUPLING LIGHT

(71) Applicant: Juniper Networks, Inc., Sunnyvale, CA (US)

(72) Inventor: Brian Koch, San Carlos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 15/685,056

(22) Filed: Aug. 24, 2017

(65) Prior Publication Data
US 2018/0113245 A1 Apr. 26, 2018

Related U.S. Application Data

(60) Provisional application No. 62/413,073, filed on Oct. 26, 2016.

(51) Int. Cl.
*G02B 6/12* (2006.01)
*G02B 6/30* (2006.01)
*F21V 8/00* (2006.01)

(52) U.S. Cl.
CPC .......... *G02B 6/003* (2013.01); *G02B 6/0025* (2013.01); *G02B 6/0031* (2013.01); *G02B 6/12002* (2013.01); *G02B 6/30* (2013.01); *G02B 2006/12102* (2013.01); *G02B 2006/12107* (2013.01)

(58) Field of Classification Search
CPC ...... G02B 6/003; G02B 6/30; G02B 6/12002; G02B 6/0031; G02B 6/0025
See application file for complete search history.

(56) References Cited

U.S. PATENT DOCUMENTS

| 7,391,524 B1* | 6/2008 | Chen | G01B 11/24 356/625 |
| 2013/0209026 A1* | 8/2013 | Doany | G02B 6/4214 385/14 |
| 2016/0091664 A1 | 3/2016 | Doany et al. | |

FOREIGN PATENT DOCUMENTS

CN 107991739 A 5/2018

OTHER PUBLICATIONS

"European Application Serial No. 17198376.0, Extended European Search Report dated Apr. 3, 2018", 10 pgs.
Hutley, M C, "Diffraction Gratings", Academic Press, XP055459461, (Jan. 1, 1982), 22-27.

* cited by examiner

*Primary Examiner* — Ryan A Lepisto
(74) *Attorney, Agent, or Firm* — Schwegman Lundberg & Woessner, P.A.

(57) ABSTRACT

An optical coupling device can couple incident light, propagating orthogonal to a layered structure, into a layer of the layered structure. The device can include a lens having a lens central axis. The lens can focus a first beam to form a converging second beam. The first beam can have a first beam central axis that is offset from the lens central axis. The second beam can have a second beam central axis that is angled with respect to the first beam central axis. A planar grating can redirect the second beam to form a converging third beam. The third beam can have a third beam central axis that is parallel to a plane of the grating. Offsetting the first beam central axis from the lens central axis in this manner can help relax wavelength, manufacturing, and/or alignment tolerances, compared to a configuration in which there is no offset.

17 Claims, 3 Drawing Sheets

GRATING AND LENS SYSTEM FOR COUPLING LIGHT

CROSS-REFERENCE TO RELATED APPLICATION

This application claims the benefit of U.S. Provisional Application No. 62/413,073, filed Oct. 26, 2016, which is incorporated herein by reference in its entirety.

TECHNICAL FIELD

The present disclosure relates to a device for coupling light between an optical fiber connector and a waveguide that is included in or coupled to a photonic integrated circuit.

BACKGROUND

An optical fiber connector can direct light from an optical fiber toward a photonic integrated circuit. For photonic integrated circuits that are formed as layered structures, it can be challenging to couple the light from the fiber into a specified layer.

BRIEF DESCRIPTION OF THE DRAWINGS

The present disclosure is illustrated by way of example and not limitation in the figures of the accompanying drawings, in which like reference numbers indicate similar elements.

Figure 1:
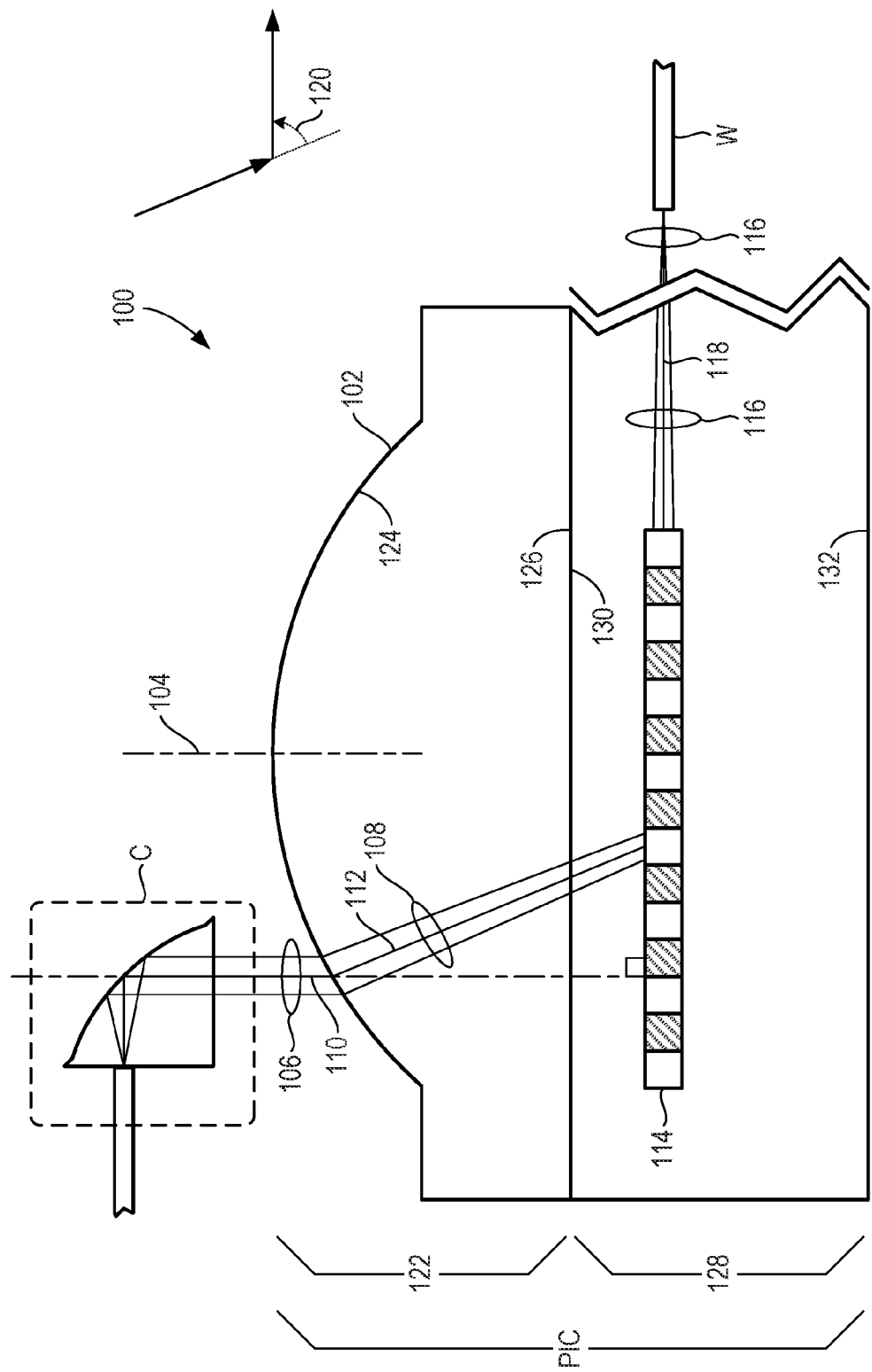
FIG. 1 shows an example of an optical device that can couple light between an optical fiber connector and a waveguide, in accordance with some embodiments.

It should be noted that elements in the drawings are not necessarily drawn to scale. The configurations shown in the drawings are merely examples, and should not be construed as limiting in any manner.

DETAILED DESCRIPTION

Photonic integrated circuits can be formed as layered structures. Inside the photonic integrated circuit, light can propagate within specified layers, such as within a waveguide that is coupled to a particular layer. One or more optical coupling devices can be used to extract light from a photonic integrated circuit, or inject light into the photonic integrated circuit.

For example, an optical coupling device can receive collimated incident light, such as from a connector operatively connected to a light source (e.g., a single-mode fiber), and collimate light from the light source. The connector can optionally redirect the collimated incident light to propagate towards one or more layers of a layered structure, optionally orthogonal to the layers in the layered structure. The light can enter a waveguide that is coupled to a layer of the layered structure.

The coupling device can include a lens having a lens central axis. The lens can focus a first beam (e.g., a collimated first beam) to form a converging second beam. The first beam can have a first beam central axis that is offset from the lens central axis. The second beam can have a second beam central axis that is angled with respect to the first beam central axis. A planar grating can redirect the second beam to form a converging third beam. The third beam can have a third beam central axis that is parallel to a plane of the grating. Offsetting the first beam central axis from the lens central axis in this manner can help relax wavelength, manufacturing, and/or alignment tolerances, compared to a configuration in which the first and second beams have centers that are positioned at a center of the lens.

Note that in the discussion herein, light can be received from an optical fiber connector, propagate through the optical coupling device, and enter a waveguide (e.g., a waveguide of a photonic integrated circuit). It will be understood that light is fully reversible through the coupling device, and the convention of light traveling from the connector to the waveguide is adopted strictly for ease of explanation. It will be understood that light can also exit the waveguide, propagate in a reverse direction through the coupling device, and enter the optical fiber connector.

FIG. 1 shows an example of an optical coupling device 100 configured to couple light between a light source such as that provided by an optical fiber connector (C) and a waveguide (W), in accordance with some embodiments. The waveguide (W) can be included in/integral with or coupled to a photonic integrated circuit (PIC). Although the optical fiber connector (C) and the waveguide (W) are shown as distinct elements/components, in other examples they can be part of the optical coupling device 100. The device 100 is but one example of a coupling device; other coupling device configurations can also be used.

The connector (C) can include an optical fiber that can emit diverging light. Accordingly, the connector (C) can include one or more collimating elements to collimate the light from the optical fiber, so that the light emerges from the connector (C) as a collimated beam. The connector (C) can also include one or more elements to redirect the beam, so that the collimated light exits the collimator with a specified propagation direction. In an example embodiment, the connector (C) may be coupled to the optical coupling device 100 using any suitable mechanical structure. In some examples, the connector (C) can also include one or more mechanical reference points, so that the propagation direction of the beam exiting the connector (C) is specified to within a particular angular tolerance with respect to the reference points. The connector (C) can be formed with a plug-in connection, with the connection being suitably precise to align the exiting beam to within a particular angular tolerance and a suitable positioning tolerance. The beam exiting the connector (C) is referred to in discussion below as a first beam.

The device 100 is shown to include a lens 102. The lens 102 can focus the first beam 106 to form a converging second beam 108. The first beam 106 can be collimated, diverging, or converging. The lens 102 can have an optical power selected such that the light from the second beam 108 can focus downstream onto a longitudinal end of a waveguide (W), for coupling into the waveguide (W).

The lens 102 can have a lens central axis 104. The first beam 106 can have a first beam central axis 110 that is offset (e.g., laterally displaced, or decentered) from the lens central axis 104. In some example embodiments, the first beam central axis 110 can intersect a surface of the lens 102 at non-normal incidence. The second beam 108 can have a second beam central axis 112 that is angled with respect to the first beam central axis 110. In some examples, in which the second beam 108 propagates through only a portion of the lens 102, one or more unused portions of the lens area may be omitted. In some of these examples, the lens central axis 104 may be external to the lens 102 itself.

In some examples, the lens 102 can be formed as opposing surfaces of a lens layer 122. The lens layer 122 can include a first surface 124 facing the first beam 106 and a second surface 126 facing away from the first beam 106. The first surface 124 can include a curved lens portion. In some examples, the first beam central axis 110 can intersect the curved lens portion at non-normal incidence. The second beam 108 can propagate from the first surface 124 of the lens layer 122 to the second surface 126 of the lens layer 122. In some examples, one or both of the first and second surfaces 124, 126 of the lens layer 122 can have zero curvature (e.g., be flat) or have a finite curvature. The lens layer 122 can include optically isotropic materials, such as silica or air. In some examples, the lens layer 122 of the optical coupling device 100 can be attached directly to a photonic integrated circuit (PIC), either on a substrate surface or on a surface that includes waveguides. In some examples, a lens surface can be external to the photonic integrated circuit (PIC), separated by an air gap. In some examples, the lens 102 can be formed as a discrete element that is attached to the device 100.

The device 100 can include a planar grating 114. The planar grating 114 can redirect the second beam 108 to form a converging third beam 116 that propagates towards the waveguide (W). The third beam 116 can have a third beam central axis 118 that is parallel to a plane of the grating 114. In some examples, the waveguide (W) can be positioned in the plane of the grating 114, such that the grating 114 can direct the converging third beam 116 onto the longitudinal end of the waveguide (W) with a specified direction, for coupling into the waveguide (W). In some examples, in which the longitudinal end of the waveguide (W) is oriented orthogonal to the waveguide (W), the grating 114 can direct the third beam 116 toward the waveguide (W) in a direction parallel to the waveguide (e.g., such that the third beam central axis 118 is parallel to the waveguide). In other examples, for which the longitudinal end of the waveguide (W) is angled with respect to the waveguide (W), the grating 114 can direct the third beam 116 toward the waveguide (W) in a suitable direction that can provide suitable coupling into the waveguide (W). In some examples, the grating 114 can be oriented orthogonal to the first beam central axis 110.

The grating 114 can redirect the second beam 108 by an angle 120 less than ninety degrees to form the converging third beam. The redirection angle 120 can be formed between the second beam central axis 112, pointing in the direction of propagation of the second beam 108, and the third beam central axis 118, pointing in the direction of propagation of the third beam 116. Redirecting by less than ninety degrees can help relax manufacturing, positioning, and/or alignment tolerances for the connector (C) and/or the waveguide (W), compared to a comparable device in which the redirection is exactly ninety degrees, such as a configuration in which the first and second beam central axes 110, 112 are coincident with the lens central axis 104.

The grating 114 can include a region in which a refractive index varies periodically. The periodic variations of the region can be oriented orthogonal to the third beam central axis 118. In some example embodiments, the periodic variations can be linear, so that the redirected third beam 116 retains about the same convergence as the incident second beam 108. In other examples, the periodic variations can additionally be curved, to impart an additional convergence onto the third beam 116. Curving the periodic variations of the grating 114 can relax some of the tolerances on the curved lens surface.

The grating 114 can be uniformly periodic. For these examples, the grating 114 can be uniform over the full area of the grating 114. Such uniformity can help relax alignment tolerances in the optical coupling device 100, because the grating 114 performance is unaltered if the second beam 108 is slightly misaligned at the grating 114. In other configurations, the grating 114 can be apodized to match an intensity profile of the second beam 108 at the grating 114. For instance, the properties of the grating 114 can vary over a particular area, in a manner that corresponds to an intensity profile of the second beam 108 at the grating 114. Such apodization can potentially allow the grating 114 performance to exceed that of a uniform grating.

In some examples, the grating 114 can be symmetric with respect to an axis that is parallel to a plane of the grating 114. For these examples, a diffraction efficiency of a positive first diffracted order of the grating 114 can equal a diffraction efficiency of a negative first diffracted order of the grating 114. In other examples, the grating 114 can be asymmetric with respect to an axis that is parallel to a plane of the grating 114. For these examples, a diffraction efficiency of a positive first diffracted order of the grating 114 can differ from a diffraction efficiency of a negative first diffracted order of the grating 114. Adjusting the diffraction efficiencies of the positive and negative diffracted orders in this manner can tailor the grating performance to a particular configuration. For example, in the configuration of FIG. 1, it is desirable to diffract as much light as possible from the second beam 108 into the diffracted order corresponding to the third beam 116, and as little light as possible into other diffracted orders.

In some examples, the grating 114 can be formed on or within a grating layer 128. The grating layer 128 can be elongated in a plane that is parallel to the grating 114. The grating layer 128 can also be parallel to the lens layer 122. The grating layer 128 can include a first surface 130 facing the lens 102 and a second surface 132 facing away from the lens 102. In some examples, the grating 114 can be positioned at the first surface 130 of the grating layer 128. In other examples, the grating 114 can be positioned at the second surface 132 of the grating layer 128. In still other examples, the grating 114 can be positioned within the grating layer 128, and spaced apart from the first and second surfaces 130, 132 of the grating layer 128.

Figure 2:
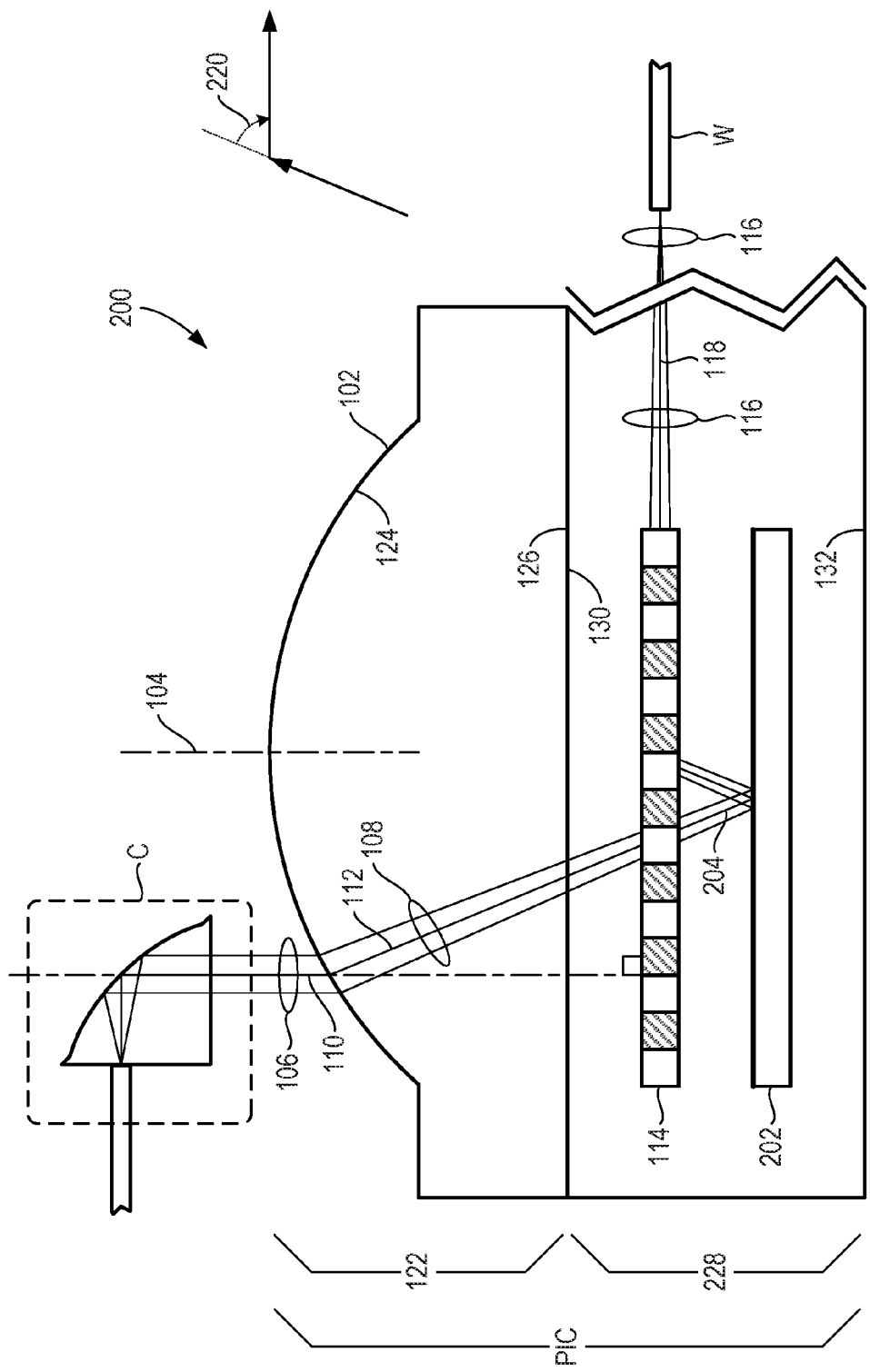
FIG. 2 shows an example of another optical device that can couple light between an optical fiber connector and a waveguide, in accordance with some embodiments.

FIG. 2 shows an example of another optical coupling device 200 that can couple light between an optical fiber connector (C) and a waveguide (W), in accordance with some embodiments. The optical coupling device 200 includes several elements that have the same function as in the optical coupling device 100. Accordingly, like references have been used to indicate the same or similar features.

Compared with the optical coupling device 100 of FIG. 1, the optical coupling device 200 of FIG. 2 adds a mirror 202 that can be included in the grating layer 128. The mirror 202 can be oriented parallel to the grating 114 and positioned such that the grating 114 is between the lens 102 and the mirror 202. The mirror 202 can reflect light from the second beam 108, which passes unredirected through the grating 114, toward the grating 114. The grating 114 can then, in turn, direct light 204 reflected from the mirror 202 into the third beam 116.

In some examples, the grating 114 can be designed so that the various diffracted orders have diffraction efficiencies that accommodate efficient coupling of light from the mirror into the third beam 116.

Further, because the mirror and grating 114 are parallel, the redirection angle 220 formed between the reflected light and the third beam central axis 118 can have the same value as in the configuration of FIG. 1. The value can also be less than ninety degrees, which can help relax manufacturing, positioning, and alignment tolerances for the connector, compared to a comparable device in which the redirection is exactly ninety degrees, such as a configuration in which the first and second beam central axes are coincident with the lens central axis 104.

Figure 3:
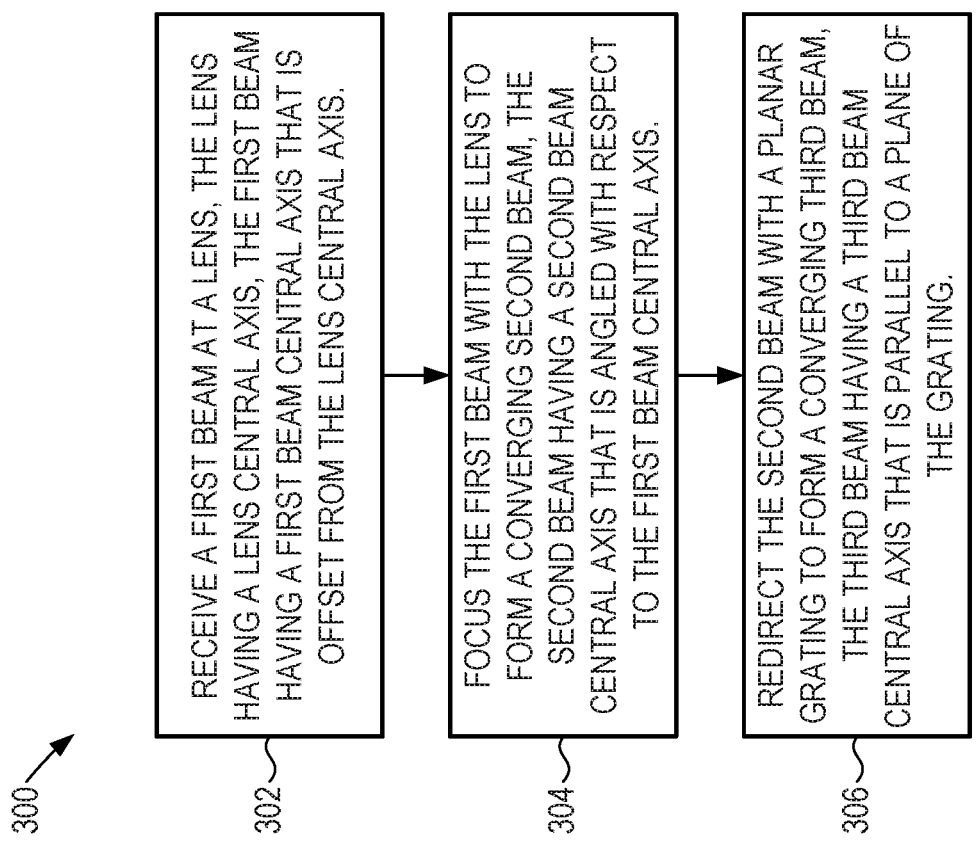
FIG. 3 shows an example of a method for coupling light, in accordance with some embodiments.

FIG. 3 shows an example of a method 300 for coupling light, in accordance with some embodiments. In some examples, the method 300 can be executed by the devices 100, 200 of FIGS. 1 and 2, although other suitable devices can also execute the method 300. The method 300 is but one method for coupling light; other suitable methods can also be used.

At operation 302, the device can receive a collimated first beam at a lens. The lens can have a lens central axis. The first beam can have a first beam central axis that is offset from the lens central axis.

At operation 304, the device can focus the first beam with the lens to form a converging second beam. The second beam can have a second beam central axis that is angled with respect to the first beam central axis.

At operation 306, the device can redirect the second beam with a planar grating to form a converging third beam. The third beam can have a third beam central axis that is parallel to a plane of the grating. In some examples, the grating can redirect the second beam by an angle less than ninety degrees. In some examples, the device can further use a mirror oriented parallel to the grating and positioned such that the grating is between the lens and the mirror to reflect toward the grating light from the second beam that passes unredirected through the grating.

To further illustrate the device and related method disclosed herein, a non-limiting list of examples is provided below. Each of the following non-limiting examples can stand on its own, or can be combined in any permutation or combination with any one or more of the other examples.

In Example 1, an optical coupling device can include: an optical connector configured to deliver light from a light source as a first beam; a lens having a lens central axis, the lens configured to focus the first beam to form a converging second beam, the first beam having a first beam central axis that is offset from the lens central axis, the second beam having a second beam central axis that is angled with respect to the first beam central axis; a planar grating configured to redirect the second beam to form a converging third beam, the third beam having a third beam central axis that is parallel to a plane of the grating; and an optical waveguide aligned with the third beam central axis and configured to receive the third beam.

In Example 2, the optical coupling device of Example 1 can optionally be configured such that the grating is configured to redirect the second beam by an angle less than ninety degrees.

In Example 3, the optical coupling device of any one of Examples 1-2 can optionally be configured such that the plane of the grating is orthogonal to the first beam central axis.

In Example 4, the optical coupling device of any one of Examples 1-3 can optionally further include a lens layer that includes the lens, the lens layer being elongated in a plane that is parallel to the grating.

In Example 5, the optical coupling device of any one of Examples 1-4 can optionally be configured such that the lens layer includes a first surface facing the first beam and a second surface facing away from the first beam, the first surface including a curved lens portion.

In Example 6, the optical coupling device of any one of Examples 1-5 can optionally be configured such that the second beam propagates from the first surface of the lens layer to the second surface of the lens layer.

In Example 7, the optical coupling device of any one of Examples 1-6 can optionally further include a grating layer that includes the grating, the grating layer being elongated in a plane that is parallel to the grating.

In Example 8, the optical coupling device of any one of Examples 1-7 can optionally be configured such that the grating layer includes a first surface facing the lens and a second surface facing away from the lens.

In Example 9, the optical coupling device of any one of Examples 1-8 can optionally be configured such that the grating is positioned at the first surface of the grating layer.

In Example 10, the optical coupling device of any one of Examples 1-9 can optionally be configured such that the grating is positioned at the second surface of the grating layer.

In Example 11, the optical coupling device of any one of Examples 1-10 can optionally be configured such that the grating is positioned within the grating layer, and spaced apart from the first and second surfaces of the grating layer.

In Example 12, the optical coupling device of any one of Examples 1-11 can optionally be configured such that the grating layer further includes a mirror oriented parallel to the grating and positioned such that the grating is between the lens and the mirror, the mirror configured to reflect toward the grating light from the second beam that passes unredirected through the grating.

In Example 13, the optical coupling device of any one of Examples 1-12 can optionally be configured such that the grating is symmetric with respect to an axis that is parallel to a plane of the grating, such that a diffraction efficiency of a positive first diffracted order of the grating equals a diffraction efficiency of a negative first diffracted order of the grating.

In Example 14, the optical coupling device of any one of Examples 1-13 can optionally be configured such that the grating is asymmetric with respect to an axis that is parallel to a plane of the grating, such that a diffraction efficiency of a positive first diffracted order of the grating differs from a diffraction efficiency of a negative first diffracted order of the grating.

In Example 15, the optical coupling device of any one of Examples 1-14 can optionally be configured such that the grating is uniformly periodic.

In Example 16, the optical coupling device of any one of Examples 1-15 can optionally be configured such that the grating is apodized to match an intensity profile of the second beam at the grating.

In Example 17, a method can include: receiving light from a light source via an optical connector, the received light forming a first beam; directing the first beam at a lens, the lens having a lens central axis, the first beam having a first beam central axis that is offset from the lens central axis; focusing the first beam with the lens to form a converging second beam, the second beam having a second beam central axis that is angled with respect to the first beam central axis; and redirecting the second beam with a planar grating to form a converging third beam, the third beam having a third beam central axis that is parallel to a plane of the grating.

In Example 18, the method of Example 17 can optionally be configured such that the grating is configured to redirect the second beam by an angle less than ninety degrees.

In Example 19, the method of any one of Examples 17-18 can optionally further include: with a mirror oriented parallel to the grating and positioned such that the grating is between the lens and the mirror, reflecting toward the grating light from the second beam that passes unredirected through the grating.

In Example 20, an optical coupling device can include: an optical connector configured to receive light from a light source as a first beam; a lens layer that includes a lens, the lens having a lens central axis, the lens configured to focus the first beam to form a converging second beam, the first beam having a first beam central axis that is offset from the lens central axis, the second beam having a second beam central axis that is angled with respect to the first beam central axis; a grating layer that includes a planar grating that is oriented orthogonal to the first beam central axis, the grating configured to redirect the second beam by an angle less than ninety degrees to form a converging third beam, the third beam having a third beam central axis that is parallel to a plane of the grating, the grating layer further including a mirror oriented parallel to the grating and positioned such that the grating is between the lens and the mirror, the mirror configured to reflect toward the grating light from the second beam that passes unredirected through the grating; and an optical waveguide aligned with the third beam central axis and configured to receive the third beam.

What is claimed is:

1. An optical coupling device, comprising:
   an optical connector configured to deliver light from a light source as a first beam;
   a lens having a lens central axis, the lens configured to focus the first beam to form a converging second beam, the first beam having a first beam central axis that is offset from the lens central axis, the second beam having a second beam central axis that is angled with respect to the first beam central axis;
   a planar grating that is oriented orthogonal to the first beam central axis, the grating configured to redirect the second beam by an angle less than ninety degrees to form a converging third beam, the third beam having a third beam central axis that is parallel to a plane of the grating; and
   an optical waveguide aligned with the third beam central axis and configured to receive the third beam.

2. The optical coupling device of claim 1, further comprising a lens layer that includes the lens, the lens layer being elongated in a plane that is parallel to the grating.

3. The optical coupling device of claim 2, wherein the lens layer includes a first surface facing the first beam and a second surface facing away from the first beam, the first surface including a curved lens portion.

4. The optical coupling device of claim 3, wherein the second beam propagates from the first surface of the lens layer to the second surface of the lens layer.

5. The optical coupling device of claim 1, further comprising a grating layer that includes the grating, the grating layer being elongated in a plane that is parallel to the grating.

6. The optical coupling device of claim 5, wherein the grating layer includes a first surface facing the lens and a second surface facing away from the lens.

7. The optical coupling device of claim 6, wherein the grating is positioned at the first surface of the grating layer.

8. The optical coupling device of claim 6, wherein the grating is positioned at the second surface of the grating layer.

9. The optical coupling device of claim 6, wherein the grating is positioned within the grating layer, and spaced apart from the first and second surfaces of the grating layer.

10. The optical coupling device of claim 6, wherein the grating layer further includes a mirror oriented parallel to the grating and positioned such that the grating is between the lens and the mirror, the mirror configured to reflect toward the grating light from the second beam that passes unredirected through the grating.

11. The optical coupling device of claim 10, wherein the grating is symmetric with respect to an axis that is parallel to a plane of the grating, such that a diffraction efficiency of a positive first diffracted order of the grating equals a diffraction efficiency of a negative first diffracted order of the grating.

12. The optical coupling device of claim 1, wherein the grating is asymmetric with respect to an axis that is parallel to a plane of the grating, such that a diffraction efficiency of a positive first diffracted order of the grating differs from a diffraction efficiency of a negative first diffracted order of the grating.

13. The optical coupling device of claim 1, wherein the grating is uniformly periodic.

14. The optical coupling device of claim 1, wherein the grating is apodized to match an intensity profile of the second beam at the grating.

15. A method, comprising:
    receiving light from a light source via an optical connector, the received light forming a first beam;
    directing the first beam at a lens, the lens having a lens central axis, the first beam having a first beam central axis that is offset from the lens central axis;
    focusing the first beam with the lens to form a converging second beam, the second beam having a second beam central axis that is angled with respect to the first beam central axis; and
    redirecting the second beam with a planar grating by an angle less than ninety degrees to form a converging third beam, the plane of the grating being orthogonal to the first beam central axis, the third beam having a third beam central axis that is parallel to a plane of the grating.

16. The method of claim 15, further comprising: with a mirror oriented parallel to the grating and positioned such that the grating is between the lens and the mirror, reflecting toward the grating light from the second beam that passes unredirected through the grating.

17. An optical coupling device, comprising:
    an optical connector configured to receive light from a light source as a first beam;
    a lens layer that includes a lens, the lens having a lens central axis, the lens configured to focus the first beam to form a converging second beam, the first beam having a first beam central axis that is offset from the lens central axis, the second beam having a second beam central axis that is angled with respect to the first beam central axis;
    a grating layer that includes a planar grating that is oriented orthogonal to the first beam central axis, the grating configured to redirect the second beam by an angle less than ninety degrees to form a converging third beam, the third beam having a third beam central axis that is parallel to a plane of the grating, the grating layer further including a mirror oriented parallel to the grating and positioned such that the grating is between the lens and the mirror, the mirror configured to reflect toward the grating light from the second beam that passes unredirected through the grating; and an optical waveguide aligned with the third beam central axis and configured to receive the third beam.

* * * * *